(12) United States Patent
Deck

(10) Patent No.: US 7,345,760 B2
(45) Date of Patent: Mar. 18, 2008

(54) GRATING MONOCHROMATOR/SPECTROGRAPH

(75) Inventor: Francis J. Deck, Madison, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 101 days.

(21) Appl. No.: 11/331,912

(22) Filed: Jan. 13, 2006

(65) Prior Publication Data

US 2007/0165224 A1   Jul. 19, 2007

(51) Int. Cl.
*G01J 3/18* (2006.01)
(52) U.S. Cl. .................. 356/334; 356/305; 356/328
(58) Field of Classification Search ............ 356/305, 356/328, 334, 326
See application file for complete search history.

(56) References Cited

U.S. PATENT DOCUMENTS

| | | | |
|---|---|---|---|
| 4,265,510 A | 5/1981 | Cook | |
| 4,773,756 A | 9/1988 | Blechinger | |
| 4,852,079 A * | 7/1989 | Kinney et al. | ............ 356/328 |
| 5,026,160 A | 6/1991 | Dorain et al. | |
| 5,192,981 A | 3/1993 | Slutter et al. | |
| 5,260,767 A | 11/1993 | Cook | |
| 5,285,255 A | 2/1994 | Baranne et al. | |
| 5,305,082 A * | 4/1994 | Bret | ............ 356/328 |
| 5,384,656 A | 1/1995 | Schwenker | |
| 5,767,966 A | 6/1998 | Iwasaki | |
| 6,507,398 B1 | 1/2003 | Arai et al. | |
| 6,886,953 B2 | 5/2005 | Cook | |
| 2004/0090623 A1* | 5/2004 | Richman | ............ 356/328 |

\* cited by examiner

*Primary Examiner*—F. L. Evans
(74) *Attorney, Agent, or Firm*—Charles B. Katz

(57) ABSTRACT

A monochromator for use in a spectrograph admits light from an aperture to a primary reflector (preferably an off-axis parabolic mirror) which collimates the input light with low aberration and directs it to a diffraction grating. The component wavelengths of the input light are then directed to first and second secondary reflectors (preferably spherical or toroidal mirrors), which are chosen to cooperatively focus the component wavelengths in ordered bands across an array detector while each at least substantially cancels the effects of any aberrations introduced by the other. By choosing optical elements which supply the grating with input light with low aberration, and then choosing optical elements which receive the component wavelengths from the grating and which offset any aberrations introduced by the other receiving optical elements, wavelength resolution at the detector can be enhanced.

21 Claims, 1 Drawing Sheet

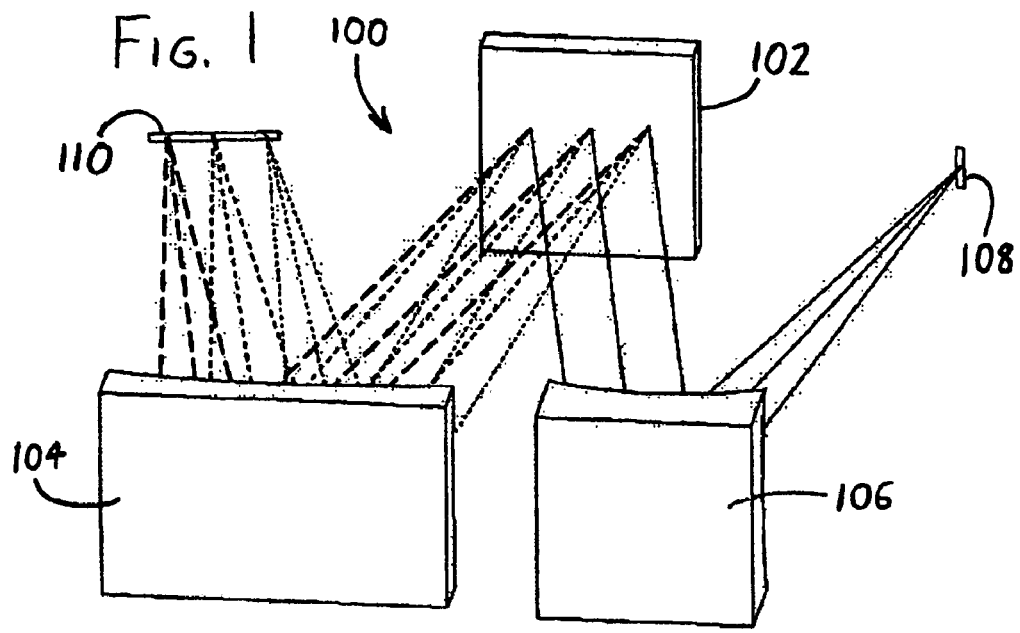
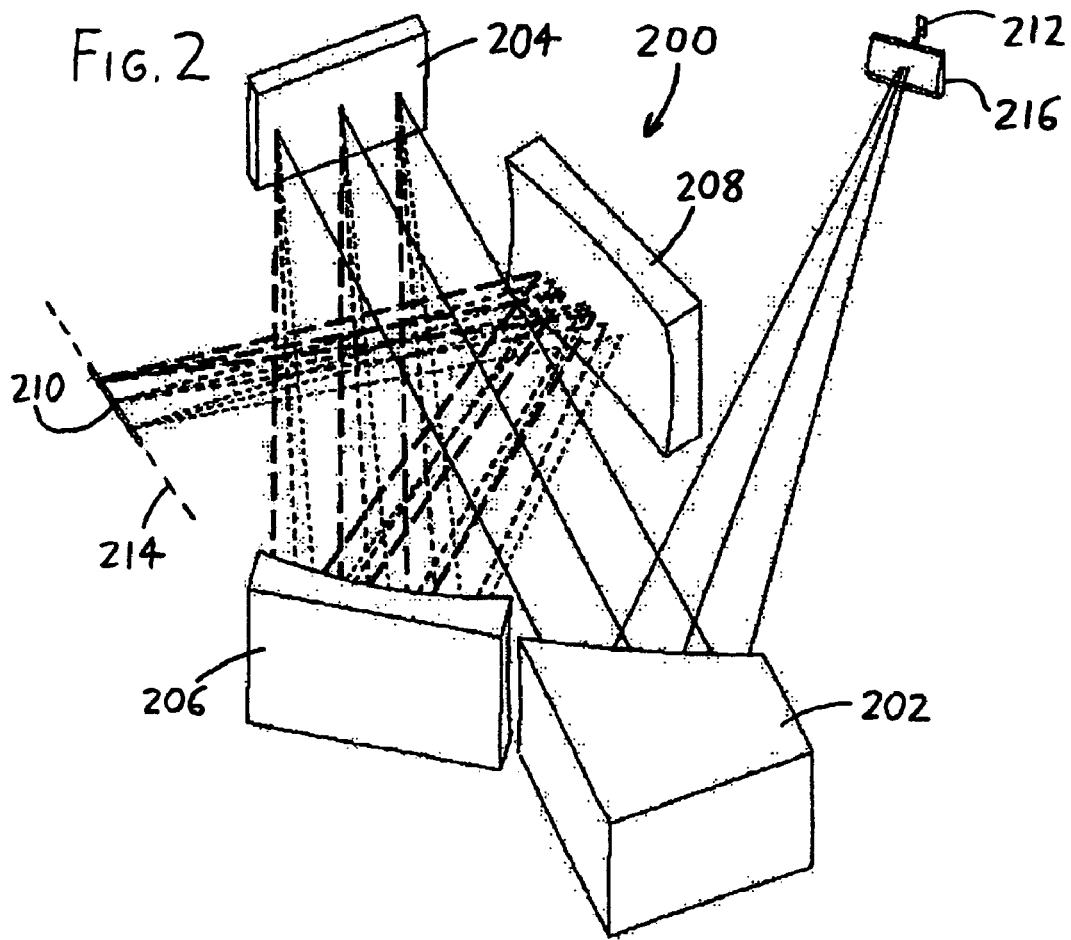

GRATING MONOCHROMATOR/SPECTROGRAPH

FIELD OF THE INVENTION

This document concerns an invention relating generally to monochromators, and more specifically to monochromators for use in spectrographs and spectrometers.

BACKGROUND OF THE INVENTION

Spectrographs (sometimes referred to as spectrometers) are common instruments used to measure the properties of input light across the component wavelengths of the input light, e.g., the intensity of the light at some or all of the component wavelengths of the input light. They are particularly useful in the fields of material and chemical analysis, where light of different types (infrared, visible, and/or ultraviolet) may be directed onto a sample, and the resulting light reflected by, emitted by, and/or transmitted through the sample can then be supplied to and analyzed by the spectrograph. The resulting readings can provide information about the properties of the sample.

A common spectrograph design incorporates a monochromator, a device which separates the input light into its component wavelengths, and a detector (usually a photosensor) which measures light intensity at one or more of the wavelengths. One type of monochromator, known as a Czerny-Turner monochromator, is depicted in the accompanying FIG. 1 at the reference numeral 100, and has three main components: a diffraction grating 102, a primary reflector 106 (a mirror, usually spherical or toroidal, supplying the grating 102 with light), and a secondary reflector 104 (a mirror, usually spherical or toroidal, receiving light from the grating 102). An aperture 108 (shown as a narrow slit, though it could be a pinhole instead) at the focus of the concave primary reflector 106 admits input light (e.g., light reflected or emitted by a sample to be analyzed), with the input light then being incident on the primary reflector 106. The primary reflector 106 collimates the light rays within the beam (reorients the rays into parallel paths focused at infinity), with the collimated beam then being directed to the diffraction grating 102. The grating 102 has an array of fine slits (not shown) arrayed across its face. (While termed "slits," these are usually not slits in the sense that they define apertures across the face of the grating 102; rather, the slit array is generally defined by an array of angled surfaces, e.g., the face of the grating 102 may have a sawtooth or sinusoidal profile on a microscopic or near-microscopic scale.) The grating 102 reflects light at different wavelengths at different angles, with FIG. 1 depicting rays at three different wavelengths by phantom/dashed lines having dashes of different sizes and spacings. All or most of the reflected light is then received by the concave secondary reflector 104, which focuses the light at each wavelength onto some output element such as an array detector 110 (e.g., an array of photosensitive elements) which measures light intensity at each of the component wavelengths. Thus, a user obtains a measurement of light intensity across the range of wavelengths incident on the detector 110, and the identities of these wavelengths may be calculated with knowledge of the characteristics of the primary reflector 106, grating 102, and secondary reflector 104 (and the location of the readings across the detector 110).

However, the arrangement of FIG. 1 can suffer from aberrations common to all non-ideal optical systems, such as coma, astigmatism, and spherical aberration. These aberrations result in distortion of the image on the detector 110 and therefore limit the resolution of the spectrograph. For example, spherical aberration, an aberration inherent in optical elements having spherical surfaces (such as in the spherical reflectors 104 and 106), can also result in some rays being out-of-focus at the detector 110 and can hinder resolution. More significantly, coma—an aberration caused by the reflection of light rays at nonperpendicular angles, wherein the rays elongate in the plane of the incident and reflected rays—cause the different-wavelength rays to at least partially overlap on the detector 110 rather than resting in separate bands, thereby affecting the accuracy of the intensity readings. Careful choice and alignment of the primary and secondary reflectors 106 and 104 can reduce coma across a range of wavelengths, with coma correction being optimal at a selected "design wavelength" and decreasing at wavelengths away from the design wavelength. As a result, the arrangement of FIG. 1 is practically limited for use at its design wavelength and for surrounding wavelengths. If a different range of wavelengths is desired, one must change the angle of the grating 102, or use a different grating 102. But these would in turn require reorientation of the primary and secondary reflectors 106 and 104, as well as reorientation and/or relocation of the detector 110, in order to reduce aberration about the new design wavelength. In practice, this is difficult and/or expensive to accomplish because of the complexity in situating the various optical elements (which must be rather precisely placed) and the need for the various positioners/actuators and controls required to accomplish placement of the optical elements.

It would therefore be useful to have a monochromator arrangement which allows high-resolution dispersion of input light into its component wavelengths over a wider range of wavelengths, and/or which more readily accommodates changes in gratings or grating angles.

SUMMARY OF THE INVENTION

The invention involves a monochromator which is intended to at least partially solve the aforementioned problems. To give the reader a basic understanding of some of the advantageous features of the invention, following is a brief summary of exemplary versions of the monochromator, with reference being made to a preferred version depicted in FIG. 2 of the drawings to enhance the reader's understanding. Since this is merely a summary, it should be understood that more details regarding different versions of the monochromator maybe found in the Detailed Description set forth elsewhere in this document. The claims set forth at the end of this document then define the various versions in which exclusive rights are secured.

Looking to FIG. 2, a monochromator 200 exemplifying the invention includes a primary reflector 202, a diffraction grating 204, a first secondary reflector 206, a second secondary reflector 208, and a photosensitive detector 210 (preferably an array detector including a series of photosensitive elements situated along a focal plane 214). The primary reflector 202 is aligned to receive input light (preferably from an input aperture 212 formed as a slit or hole) and reflect the input light in collimated form to the diffraction grating 204. The grating 204 reflects the different component wavelengths of the collimated input light at different respective angles (with three different wavelengths again being depicted by dashed lines having different dash densities). The component wavelengths are then received by a first secondary reflector 206 and reflected to a second secondary reflector 208, which in turn receives the component wavelengths and reflects them onto different respective regions of the detector 210, with each of the secondary reflectors 206 and 208 serving to partially focus the component wavelengths onto the detector 210.

The primary reflector 202 is preferably an off-axis parabolic mirror, i.e., a section of a parabolic mirror oriented to receive the input light from a direction off the axis of the parabola, since such a mirror can provide effectively ideal collimation of the input light from the aperture 212, with no or minimal aberration. Thus, whereas prior arrangements using spherical mirrors and similar elements introduced aberrations which were then anamorphically magnified by the diffraction grating, here the collimated input light enters and exits the diffraction grating 204 with no or little aberration. The secondary reflectors 206 and 208, which are preferably spherical or toroidal mirrors, are then chosen to both (1) cooperate to focus the diffracted component wavelengths of the input light onto the detector 210, and (2) have the second secondary reflector 208 provide corrections to the component wavelengths which at least substantially cancel any aberrations introduced by the first secondary reflector 206. The detector 210 is then situated along a focal plane 214 which is oriented to accommodate the focal points of the reflected component wavelengths of the input light. Since the input light is provided to the grating 204 with no or little aberration (and thus the grating 204 provides no or little magnification of such aberration), and since the secondary reflectors 206 and 208 at least substantially cancel any aberration introduced while focusing the component wavelengths onto the focal plane 214, superior wavelength resolution results.

An interesting characteristic of the monochromator 200 is that the rays of input light and its component wavelengths will cross in the "wavelength plane" (the plane along which the elements are located and wherein the wavelengths of the input light are separated), unless the beams are redirected/folded out of the wavelength plane by the use of additional optical elements (which then increase size and cost, and also potentially introduce further aberration). In particular, the light received by and reflected from the diffraction grating 204 (from the primary reflector 202 and to the first secondary reflector 206) intersects the paths of the light received by and reflected from the second secondary reflector 208 (from the first secondary reflector 206 and to the detector 210).

When a change in the design wavelength is desired, it is preferred that rather than reorienting the grating 204 (and correspondingly reorienting/relocating any of the other optical elements and/or the detector 210), the grating 204 should simply be replaced with a different grating 204 having the desired design wavelength. This could be done by providing the grating 204 in a frame which allows manual grating removal and replacement, or different gratings 204 could be provided on a motorized track or wheel which can be translated and/or rotated to situate a desired grating 204 in place.

A lens 216 (here depicted as a cylindrical lens) may also be provided between the input aperture 212 and the primary reflector 202 to reduce astigmatism in the "non-wavelength" plane perpendicular to the plane in which the light wavelengths are separated, i.e., to concentrate the light in the wavelength plane. This allows the detector 210 to be made with lesser height in planes perpendicular to the wavelength plane (with the detector 210 in FIG. 2 having low height in a vertical direction), which can be beneficial for space reduction, as well as for reducing detector noise (e.g., by providing lesser area for impingement by cosmic rays, which can generate spurious detector readings). The lens 216 allows optical elements such as the primary reflector 202, diffraction grating 204, first secondary reflector 206, and second secondary reflector 208 to also be provided with lesser vertical height (and thus an overall "thin" configuration for the monochromator 200) if desired.

Further advantages, features, and objects of the invention will be apparent from the following Detailed Description of the invention in conjunction with the associated drawings.

BRIEF DESCRIPTION OF THE DRAWINGS

FIG. 1 is a schematic perspective view of a conventional (Czerny-Turner-type) monochromator 100, wherein a primary reflector 104 accepts input light from an aperture 108 and reflects collimated light to a diffraction grating 102, and wherein a secondary reflector 106 then focuses the resulting rays (which are reflected from the grating 102 at different angles in accordance with their wavelengths) onto an array detector 110, which then measures light intensity at each wavelength.

FIG. 2 is a schematic perspective view of a monochromator arrangement exemplifying the present invention, wherein a primary reflector accepts input light from an aperture and reflects collimated light to a diffraction grating; a first secondary reflector then receives the diffracted wavelengths and directs them to a second secondary reflector; and the second secondary reflector focuses each of the diffracted wavelengths onto a respective area of an array detector, which measures light intensity at each wavelength.

DETAILED DESCRIPTION OF PREFERRED VERSIONS OF THE INVENTION

To expand on the discussion given in the foregoing Summary, following is a detailed description of components and specifications used to construct an exemplary version of the invention.

The input aperture 212 was custom fabricated from a glass plate with a metallic coating, with the coating being selectively removed via photolithography to form three apertures 212 (which could then be selectively chosen for use as desired): a 25×2000 micrometer rectangular slit, a 100 micrometer circular hole, and a 25 micrometer circular hole. The input lens 216 was chosen to be a model CYL13563 cylindrical lens from JML Optical (Rochester, N.Y.), having 25 mm focal length.

The primary reflector 202 is a diamond-turned off-axis parabolic aluminum mirror with a 240 mm effective focal length, 40 degree included angle between entrance and exit beams, and roughly 62 mm clear aperture, and was custom fabricated by Corning Net Optix (Keene, N.H.).

The first secondary reflector 206 is a concave spherical mirror with a 678.79 mm radius of curvature, and is nominally 60 mm in diameter. The second secondary reflector 208 is also a concave spherical mirror with a 1013.18 mm radius of curvature, and is also nominally 60 mm in diameter. Both secondary reflectors 206 and 208 were custom fabricated by JML Optical (Rochester, N.Y.).

An exemplary grating 204 usable in the monochromator 200 is the model 53119BK01-266R from Newport (Rochester, N.Y.), having 900 grooves per millimeter and a blaze wavelength of 0.56 microns.

An exemplary detector 210 is a Toshiba TCD1201D photodiode array (PDA) chip having a row of 2048 pixels (elements) arrayed along a focal plane 214, each element being approximately 14 micrometers wide by 200 micrometers tall (i.e., the entire array is approximately 2.87 cm wide by 200 micrometers tall).

The foregoing elements were arranged as follows (the following distances and angles being rounded to the nearest millimeter or degree): 12 mm from the input aperture 212 to the input lens 216; 226 mm from the input lens 216 to the primary reflector 202; 250 mm from the primary reflector 202 to the grating 204 (and a 20 degree separation between entrance and exit beams on the grating 204); 180 mm from the grating 204 to the first secondary reflector 206 (and a 30 degree included angle on the first secondary reflector 206); 134 mm from the first secondary reflector 206 to the second secondary reflector 208 (and a 48 degree included angle on the second secondary reflector 208); and 137 mm from the second secondary reflector 208 to the detector 210 (with a 14 degree tilt at the detector 210).

It should be understood that the invention may accommodate a wide range of distances, angles, and components other than those noted above, with optical systems design packages such as ZEMAX (Zemax Development Corporation, Bellvue, Wash.) being useful for testing the compatibility of proposed components, providing acceptable component specifications and layouts if basic design parameters are provided, and/or for optimizing proposed designs.

It is emphasized that the foregoing discussion merely relates to preferred versions of the invention, and numerous modifications can be made. Following is a brief exemplary list of such modifications.

Initially, the monochromator 200 is preferably provided with baffles (not shown for sake of clarity) which extend at least partially about the outer boundaries of the light reflected from each optical element, but which terminate where beams intersect so the baffles do not block the intended transmission of light from one optical element to another. The baffles therefore reduce "stray light," i.e., accidentally scattered light caused by imperfections in the elements (for example, stray light beams unintentionally reflected from the primary reflector 202 to the first or second secondary reflector 204/206 or to the detector 210, from the grating 204 to the second secondary reflector 26 or to the detector 210, etc. Since stray light can lead to spurious readings at the detector 210, the use of baffles or other means of stray light reduction can help increase the resolution of the monochromator 200.

As previously noted, a lens 216 can receive the light from the input aperture 212 and help concentrate the input light about a central "wavelength" plane wherein the wavelengths are separated. This adaptation could allow input from a slit input aperture 212 to be provided to an array of lenses 216 in the non-wavelength plane (i.e., arrayed in the vertical direction in FIG. 2), and in turn to the optical elements (the primary reflector 202, diffraction grating 204, first secondary reflector 206, and second secondary reflector 208), wherein the diffraction grating 204 is not a single grating but is in fact a series of stacked gratings which are each optimized for different wavelength ranges. A series of stacked detectors 210 can then receive the output from each grating. The various gratings and detectors would thereby allow detection of a broader range of wavelengths without the need to replace gratings. In this version of the invention, sheet-like baffles would preferably be provided between each element in the grating/detector "stack" so as to prevent crosstalk.

The focal plane 214 along which the detector 210 is arrayed need not be a true plane, i.e., it may be a curved surface. Depending on the optical elements chosen for the secondary reflectors 206 and 208, the focal points for the component wavelengths may be situated along a curve, in which case the photosensitive elements that form the detector 210 could be arrayed along the curve. However, in many instances the curvature is sufficiently small that a linear/planar array detector 210 can be used with minor loss of resolution (owing to some wavelength bands being out of focus on the detector 210).

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A monochromator comprising:
    a) detector;
    b) a primary reflector including an off-axis parabolic mirror;
    c) a diffraction grating receiving from the primary reflector collimated input light containing multiple light wavelengths, and reflecting the different light wavelengths of the collimated light at different respective angles;
    d) a first secondary reflector receiving and reflecting the different light wavelengths from the diffraction grating; and
    e) a second secondary reflector receiving the different light wavelengths from the first secondary reflector and reflecting the different light wavelengths onto different respective regions of the detector.

2. The monochromator of claim 1 wherein at least one of the paths of the light received by or reflected from the diffraction grating intersects at least one of the paths of the light received by or reflected from the second secondary reflector.

3. The monochromator of claim 1 wherein the first secondary reflector and second secondary reflector are oriented such that the path traveled by the different light wavelengths transmitted therebetween crosses the path of the collimated input light received by the diffraction grating.

4. The monochromator of claim 1 wherein the diffraction grating, first secondary reflector, and second secondary reflector are oriented such that the path traveled by the different light wavelengths transmitted between the second secondary reflector and the detector crosses the paths of:
    a) the collimated input light received by the diffraction grating, and
    b) the different light wavelengths transmitted between the diffraction grating and the first secondary reflector.

5. The monochromator of claim 1 wherein the paths traveled by light transmitted between the primary reflector, diffraction grating, first secondary reflector, and second secondary reflector all rest within at least substantially the same plane, with the path of the light transmitted between the primary reflector and the diffraction grating intersecting at least one of the paths of:
    a) the light wavelengths traveling between the diffraction grating and the first secondary reflector, and
    b) the light wavelengths traveling between the first secondary reflector and the second secondary reflector.

6. The monochromator of claim 1 further comprising an input aperture through which input light is directed to the primary reflector.

7. The monochromator of claim 1 wherein at least one of the first secondary reflector and the second secondary reflector is a spherical mirror.

8. The monochromator of claim 1 wherein at least one of the first secondary reflector and the second secondary reflector is a toroidal mirror.

9. The monochromator of claim 1 wherein the first secondary reflector and second secondary reflector are each chosen from one of:
 a) a spherical mirror, and
 b) a toroidal mirror.

10. The monochromator of claim 1 wherein the detector is defined by an array of photosensitive elements.

11. A monochromator comprising:
 a) a primary reflector receiving input light and reflecting collimated input light, the primary reflector including an off-axis parabolic mirror;
 b) a grating receiving the collimated light and reflecting component light wavelengths of the collimated light at different angles;
 c) a nonplanar first secondary reflector receiving and reflecting the component light wavelengths; and
 d) a nonplanar second secondary reflector receiving the reflected component light wavelengths and reflecting them onto a focal plane, wherein each light wavelength is focused onto a corresponding region of the focal plane.

12. The monochromator of claim 11 wherein at least one of the paths of the light received by or reflected from the diffraction grating intersects at least one of the paths of the light received by or reflected from the second secondary reflector.

13. The monochromator of claim 11 wherein the path of the reflected component light wavelengths traveling between the first secondary reflector and the second secondary reflector intersects the path of the input light traveling between the primary reflector and the grating.

14. The monochromator of claim 11 wherein the path of the reflected component light wavelengths traveling between the grating and the first secondary reflector intersects the path of the reflected component light wavelengths traveling between the second secondary reflector and the focal plane.

15. The monochromator of claim 11 wherein at least one of the first secondary reflector and the secondary reflector is a spherical mirror.

16. The monochromator of claim 11 wherein at least one of the first secondary reflector and the second secondary reflector is a toroidal mirror.

17. The monochromator of claim 11 wherein the focal plane has an array detector thereon.

18. A monochromator comprising:
 a) a primary reflector oriented to receive input light from an input aperture, the primary reflector including an off-axis parabolic mirror;
 b) a diffraction grating oriented to receive light reflected from the primary reflector;
 c) a first secondary reflector oriented to receive light reflected from the diffraction grating;
 d) a second secondary reflector oriented to receive light reflected from the first secondary reflector; and
 e) a photosensitive detector oriented to receive light reflected from the second secondary reflector,
wherein at least one of the paths of the light received by or reflected from the diffraction grating intersects at least one of the paths of the light received by or reflected from the second secondary reflector.

19. The monochromator of claim 18 wherein the path of the light reflected from the second secondary reflector to the detector intersects both of the paths of the light received by and reflected from the diffraction grating.

20. The monochromator of claim 18 wherein the path of the light reflected from the primary reflector to the diffraction grating intersects both of the paths of the light received by and reflected from the second secondary reflector.

21. The monochromator of claim 18 wherein the first secondary reflector and second secondary reflector are each chosen from one of:
 a) a spherical mirror, and
 b) a toroidal mirror.

* * * * *